United States Patent
Leyten et al.

(10) Patent No.: US 7,397,196 B2
(45) Date of Patent: Jul. 8, 2008

(54) CIRCUIT ARRANGEMENT FOR PREVENTING HIGH PEAK CURRENTS

(75) Inventors: Lukas Leyten, Pila (PL); Christofher Daniel Charles Hooijer, Eindhoven (NL); Roy Hendrik Anna Maria Van Zundert, Eindhoven (NL); Gerlach Corne Pieter Maria Emmen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 3 days.

(21) Appl. No.: 10/599,375

(22) PCT Filed: Mar. 24, 2005

(86) PCT No.: PCT/IB2005/051017

§ 371 (c)(1), (2), (4) Date: Sep. 27, 2006

(87) PCT Pub. No.: WO2005/096679

PCT Pub. Date: Oct. 13, 2005

(65) Prior Publication Data

US 2007/0222392 A1  Sep. 27, 2007

(30) Foreign Application Priority Data

Mar. 31, 2004  (EP) .................................. 04101315

(51) Int. Cl.
*H05B 37/02* (2006.01)
(52) U.S. Cl. ...................... 315/224; 315/225; 315/247; 315/274; 315/209 R
(58) Field of Classification Search ................. 315/224, 315/225, 209 R, 246, 247, 291, 307, 274–289
See application file for complete search history.

(56) References Cited

U.S. PATENT DOCUMENTS

| | | | |
|---|---|---|---|
| 4,912,374 A | 3/1990 | Nagase et al. | |
| 5,434,479 A * | 7/1995 | Ohnishi et al. | ........... 315/209 R |
| 5,594,635 A * | 1/1997 | Gegner | ....................... 363/124 |
| 6,426,597 B2 | 7/2002 | Rast et al. | |
| 6,646,392 B2 | 11/2003 | Kpenv | |
| 2004/0189215 A1* | 9/2004 | Chen | ........................... 315/224 |
| 2007/0047612 A1* | 3/2007 | Keough | ....................... 373/52 |

* cited by examiner

*Primary Examiner*—Tuyet Vo

(57) ABSTRACT

A driver for HID lamps includes four switches and generates a constant DC-current that is commutated at a low frequency. The driver includes a filter capacitor. The occurrence of peak currents due to the charging or discharging of the filter capacitor is prevented by driving one of the switches at a high frequency immediately after commutation.

12 Claims, 3 Drawing Sheets

CIRCUIT ARRANGEMENT FOR PREVENTING HIGH PEAK CURRENTS

Figure 1:
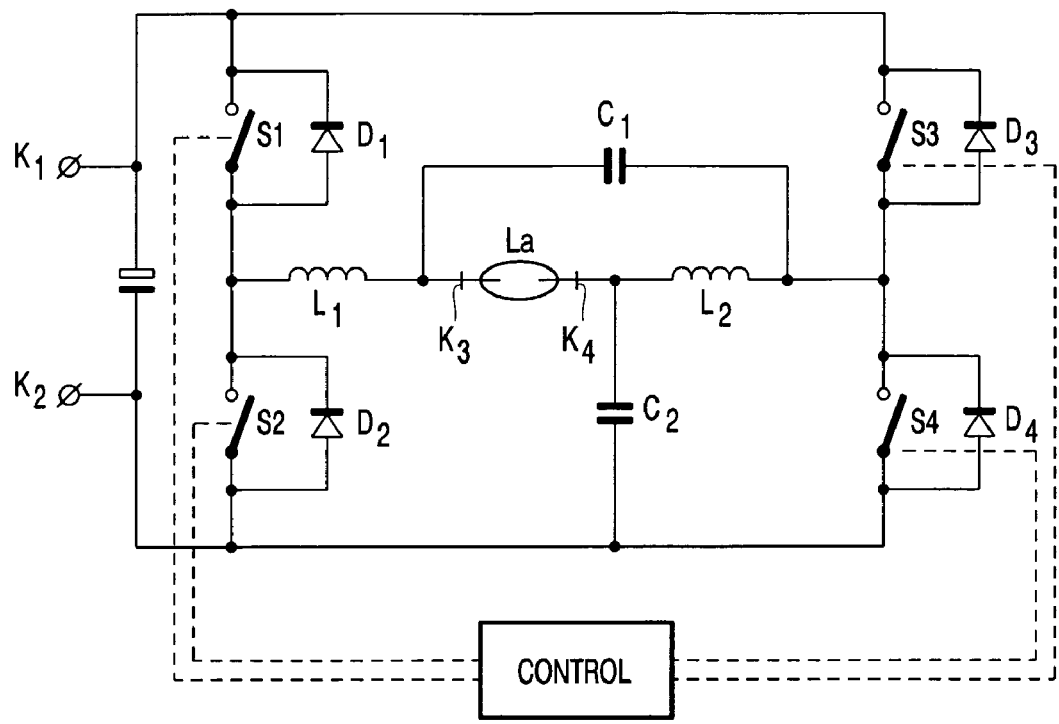

The invention relates to a circuit arrangement for operating a lamp equipped with
- input terminals for connection to the poles of a supply voltage source,
- a first series arrangement comprising a first switching element shunted by a first diode and a second switching element shunted by a second diode and connecting the input terminals,
- a second series arrangement comprising a third switching element shunted by a third diode and a fourth switching element shunted by a fourth diode and connecting the input terminals,
- a load circuit connecting a terminal between the first and the second switching element with a terminal between the third and the fourth switching element and comprising a series arrangement of an inductor L1, terminals for lamp connection and an inductor L2,
- a control circuit coupled to control electrodes of the switching elements and comprising circuitry for controlling the circuit arrangement in a first operating state in which the fourth switching element is maintained in a conductive state while the first switching element is rendered alternately conductive and non-conductive at a high frequency, and for controlling the circuit arrangement in a second operating state in which the third switching element is maintained in a conductive state while the second switching element is rendered alternately conductive and non-conductive at a high frequency, and for alternating the operating state of the circuit arrangement between the first and the second operating state at a low frequency,
- a capacitor C1 coupled with a first end to a terminal of the load circuit between the inductor L1 and a terminal for lamp connection.

Such a circuit arrangement is known from U.S Pat. No. 6,426,597 B2, more in particular as an operating circuit for HID lamps. The capacitor C1 shunts a series arrangement comprising the lamp connection terminals and the inductor L2. After the lamp has ignited the control circuit controls the circuit arrangement alternately in the first operating state and the second operating state at a low frequency. In the first operating state, the first switching element together with the second diode and the inductor L1 and capacitor C1 form a first DC-DC-converter of the type "down converter". During this first operating state, the first DC-DC-converter generates a DC current with a first polarity direction that flows through the lamp. In practice, an AC current with a small amplitude and a frequency equal to the frequency with which the first switching element is controlled is superimposed on the DC current. In the second operating state, the second switching element together with the first diode and the inductor L1 and capacitor C1 form a second DC-DC-converter of the type "down converter". During this second operating state, the second DC-DC-converter generates a DC current with a second polarity direction that flows through the lamp. Again a high frequency AC current with a small amplitude and a frequency that equals the frequency at which the second switching element is operated is superimposed on the DC current. Thus the lamp current is a low frequency square wave shaped AC current. The known circuit arrangement offers important advantages such as low component count and a high open circuit voltage.

However, the known circuit arrangement also has a few disadvantages. One of the disadvantages is that, when the operating state of the circuit arrangement changes, the polarity of the voltage across capacitor C1 changes as well causing a very high current through the components. More in particular, in case the circuit arrangement operates without a lamp connected to it or with a lamp connected to it that does not conduct current because of failure or because the discharge temporarily extinguishes when the lamp has not yet reached stable operating conditions, the voltage across capacitor C1 generates high peak currents through the first switching element or the second switching element or other components when the third or the fourth switching element is rendered conductive. These high peak currents can damage the first and/or second switching element so that it is necessary to include additional features in the circuit arrangement to prevent such currents thereby rendering the circuit arrangement complex and expensive.

The invention aims to provide a comparatively simple and robust circuit arrangement wherein the occurrence of high peak currents through the components making up the circuit arrangement is prevented.

A circuit arrangement as mentioned in the opening paragraph is therefor in accordance with the invention characterized in that a second end of the capacitor C1 is coupled to an input terminal, and in that the control circuit comprises circuitry for controlling the circuit arrangement in a third operating state, in which the first and third switching element are operated in such a way that at least one of these switching elements is rendered alternately conductive and non-conductive at a high frequency, during a time interval between subsequent operation in the first and the second operating state, and for controlling the circuit arrangement in a fourth operating state, in which the second and fourth switching element are operated in such a way that at least one of these switching elements is rendered alternately conductive and non-conductive at a high frequency, during a time interval between subsequent operation in the second and the first operating state.

In a circuit arrangement according to the invention, peak currents are avoided to a large extent when the operating state of the circuit arrangement changes, not even in case the circuit arrangement operates without a lamp or the lamp does not carry a current. Although the polarity of the voltage across capacitor C1 is the same in both the first and the second operating state, the voltage across capacitor C1 has a different value in the second operating state than in the first operating state. In case the control circuit would change the operating state of the circuit arrangement directly from the first operating state into the second operating state, a peak current would flow from the supply voltage source through the third switching element, the inductor L2 and through the capacitor C1. This peak current could damage the third switching element and other circuit components or the lamp. However, in a circuit arrangement according to the invention, at the end of for instance a time interval during which the circuit arrangement is controlled in the first operating state, the control circuit controls the circuit arrangement in the third operating state during which at least one of the first switching element and the third switching element is rendered alternately conductive and non-conductive at a high frequency.

In case only the first switching element is operated at a high frequency during the third operating state, the third switching element is maintained in a non-conductive state and the first switching element, the second diode and inductor L1 together form a down converter. The amplitude of the current flowing from the supply voltage source through (alternately) the first switching element and the second diode, inductor L1 and the capacitor C1 is controlled by the duty cycle and frequency of the control signal generated by the control circuit that controls the first switching element. The frequency and duty cycle of the control signal are chosen so that the amplitude of the current is limited to a value that is low enough to prevent damage to circuit components.

In case only the third switching element is operated at a high frequency during the third operating state, the first switching element is maintained in a non-conductive state and the third switching element, the fourth diode and inductor L2 together form a down converter. The amplitude of the current flowing from the supply voltage source through (alternately) the third switching element and the fourth diode, inductor L2, the lamp La and the capacitor C1 is controlled by the duty cycle and frequency of the control signal generated by the control circuit that controls the third switching element. The frequency and duty cycle of the control signal are chosen so that the amplitude of the current is limited to a value that is low enough to prevent damage to circuit components and the occurrence of peak currents through the lamp is avoided.

In case both the first switching element and the third switching element are operated at a high frequency during the third operating state, two current paths are used at the same time so that the third operating state can be shorter.

The time interval during which the circuit arrangement is controlled in the third operating state is such that capacitor C1 has become sufficiently charged by the supply voltage source to prevent the occurrence of current peaks in the second operating state, during which the third switching element is continuously conductive. This can be realized by maintaining the circuit arrangement in the third operating state during a predetermined time interval. Alternatively the voltage across capacitor C1 or the amplitude of the current charging C1 can be measured and the third operating state can be terminated when the voltage across capacitor C1 exceeds a reference value or when the amplitude of the current charging capacitor C1 drops below a reference value respectively. At the end of the time interval during which the circuit arrangement is in the third operating state, the control circuit changes the operating state of the circuit arrangement into the second operating state. Similarly, at the end of a time interval during which the circuit arrangement is controlled in the second operating state, the control circuit controls the circuit arrangement in the fourth operating state during which either the second switching element or the fourth switching element or each of these switching elements is rendered alternately conductive and non-conductive at a high frequency.

In case only the second switching element is operated at a high frequency during the fourth operating state, the fourth switching element is maintained in a non-conductive state and the second switching element, the first diode and inductor L1 together form a down converter. The amplitude of the current flowing from capacitor C1 through inductor L1 and (alternately) the second switching element and the first diode is controlled by the duty cycle and frequency of the control signal generated by the control circuit that controls the second switching element. The frequency and duty cycle of the control signal are chosen so that the amplitude of the current is limited to a value that is low enough to prevent damage to circuit components.

In case only the fourth switching element is operated at a high frequency during the fourth operating state, the second switching element is maintained in a non-conductive state and the fourth switching element, the third diode and inductor L2 together form a down converter. The amplitude of the current flowing from the capacitor C1 through the lamp, inductor L2 and (alternately) the fourth switching element and the third diode is controlled by the duty cycle and frequency of the control signal generated by the control circuit that controls the third switching element. The frequency and duty cycle of the control signal are chosen so that the amplitude of the current is limited to a value that is low enough to prevent damage to circuit components and the occurrence of peak currents through the lamp is avoided.

In case both the second switching element and the fourth switching element are operated at a high frequency during the fourth operating state, two current paths are used at the same time so that the fourth operating state can be shorter.

Similar to the third operating state, the time interval during which the circuit arrangement is controlled in the fourth operating state is such that capacitor C1 has become sufficiently discharged to prevent the occurrence of current peaks in the first operating state, in which the fourth switching element is continuously conductive. The time interval during which the circuit arrangement is controlled in the fourth operating state can be controlled in the same ways indicated hereabove as in which the time interval during which the circuit arrangement is operated in the third operating state is controlled At the end of this time interval the control circuit changes the operating state of the circuit arrangement into the first operating state.

The circuit arrangement disclosed in U.S. Pat. No. 6,426,597 B2 includes a capacitor C2, that together with inductor L2 is part of a series arrangement shunting the fourth switching element. Ignition of the lamp can be realized by rendering the third and the fourth switching element alternately conductive and non-conductive at a frequency close to the resonant frequency of inductor L2 and capacitor C2. Alternatively the frequency at which the third and fourth switching element are operated can be swept down to a frequency close to the resonant frequency of inductor L2 and capacitor C2.

However, upon ignition of the lamp the voltage across C2 generates a high peak current through the lamp, C1 and either the third or the fourth switching element. In order to prevent damage to the components due to this peak current special precautions have to be taken, such as an additional inductor in the current path. Furthermore, capacitor C2 would cause current peaks in the lamp current during stationary operation and therefor has to be disabled during stationary operation by means of an additional switching element.

It has been found that a lamp operated by a circuit arrangement according to the invention can be effectively ignited in case the lamp is shunted by a capacitor C2. The lamp can be effectively ignited by rendering the third and the fourth switching element alternately conductive and non-conductive at a frequency close to the resonance frequency of inductor L2 and capacitor C2 or by means of a frequency sweep. Furthermore, the peak current generated during ignition flows through the lamp only and thus cannot damage the components of the circuit arrangement. However, an effective ignition of the lamp can also be realized in case a capacitor C2 is coupled between an input terminal and a terminal between a terminal for lamp connection and inductor L2. Also with capacitor C2 in this latter position, ignition is realized by rendering the third and the fourth switching element alternately conductive and non-conductive at a frequency close to the resonance frequency of inductor L2 and capacitor C2 or by means of a frequency sweep. The peak current generated during ignition flows from capacitor C2 through the lamp and through capacitor C1 back to capacitor C2, so that the peak current cannot damage the switching elements. When in this latter position, capacitor C2 can also play a role in filtering high frequency components out of the lamp current thereby contributing to a stable operation of the lamp.

In a preferred embodiment, the control circuit further comprises circuitry for increasing the duty cycle of the first switching element at the end of the first operating state and circuitry for increasing the duty cycle of the second switching element at the end of the second operating state. Increasing the duty cycle of the first switching element in the first operating state means increasing the time lapse during which the first switching element is maintained in a conductive state in each high frequency period of the control signal generated by the control circuit and controlling the first switching element. Because of this increase in duty cycle, the voltage across capacitor C1 is increased. As a consequence less current needs to flow from the supply voltage source to capacitor C1 during the third operating state, so that the third operating state can be shorter. Since hard switching can occur during the third operating state, it is preferred to keep the time interval during which the circuit arrangement is in the third operating state comparatively short. Similarly, increasing the duty cycle of the second switching element at the end of the second operating state decreases the voltage across capacitor C1. As a consequence less current needs to flow from the capacitor C1 during the fourth operating state, so that the fourth operating state can be shorter. Also during the fourth operating state hard switching can occur. Therefor it is also preferred to keep the time interval during which the circuit arrangement is in the fourth operating state comparatively short.

For the same reasons as outlined in the previous paragraph, it is advantageous when the control circuit comprises circuitry for controlling the circuit arrangement in a fifth operating state, in which the fourth switching element is rendered alternately conductive and non-conductive at a high frequency, during a time interval between subsequent operation in the first and the third operating state, and for controlling the circuit arrangement in a sixth operating state, in which the third switching element is rendered alternately conductive and non-conductive at a high frequency, during a time interval between subsequent operation in the second and the fourth operating state. In case the operating state of the circuit arrangement is changed from the first to the third state directly, the current through the load circuit does not change its direction immediately because of the presence of inductors L1 and L2. Since the fourth switching element is non-conductive during the third operating state, the current through the load circuit flows causes a current peak through diode D3 during a first part of the third operating state. In case, however, the fifth operating state is inserted between the first and the third operating state, the current through the load circuit is gradually decreased during this fifth operating state by the high frequency switching of the fourth switching element and the occurrence of a current peak through the third diode is avoided. At the same time the voltage across the capacitor C1 is increased to some extent already during the fifth operating state so that the third operating state during which the capacitor C1 is charged further can be comparatively short. During the fifth and the third operating state, capacitor C1 is charged gradually to the voltage that is present across it during the second operating state. Since the charging of capacitor C1 is taking place by means of a current of which the amplitude is changing gradually, peaks in the current through the lamp are also avoided so that the amount of EMI caused by the lamp operation is comparatively low while lamp life is comparatively long.

Similarly, capacitor C1 is discharged by means of a current of which the amplitude is changing gradually during the sixth and the fourth operating state. As a consequence peaks in the current through the lamp are also avoided so that the amount of EMI caused by the lamp operation is comparatively low while lamp life is comparatively long.

It is possible to maintain the first switching element in a conductive state during the fifth operating state and to maintain the second switching element in a conductive state during the sixth operating state. Alternatively it is possible to render the first switching element alternately conductive and non-conductive at a high frequency during the fifth operating state and to render the second switching element alternately conductive and non-conductive at a high frequency during the sixth operating state. Preferably, the control circuit comprises circuitry for increasing the duty cycle of the first switching element during the fifth operating state and for increasing the duty cycle of the second switching element during the sixth operating state. Similarly, the control circuit is preferably equipped with means for decreasing the duty cycle of the fourth switching element during the fifth operating state and for decreasing the duty cycle of the third switching element during the sixth operating state. The increase in duty cycle of the first switching element and the decrease in duty cycle of the fourth switching element during the fifth operating state both serve to ensure that the current charging capacitor C1 is changing only gradually so that no current peaks occur in the lamp current. The same is true for the increase in duty cycle of the second switching element and the decrease of the duty cycle of the third switching element during the sixth operating state.

Similarly it is preferred when the duty cycle of each of the switching elements that is operated at a high frequency during the third operating state is increased during the third operating state and when the duty cycle of each of the switching elements that is operated at a high frequency during the fourth operating state is increased during the fourth operating state. This increase in the duty cycle further contributes to ensure that the current through the lamp is changing gradually while no peaks in the lamp current occur.

In the description of the functioning of a circuit arrangement according to the invention in its different operating states as presented so far, it has been mentioned that whenever a switching element that is operated at a high frequency becomes non-conductive, the diode that is placed in series with that switching element becomes conductive. It is however possible to render the switching element parallel to this diode conductive so that the current is flowing through this latter switching element and less power is dissipated. Also recovery losses in the diode are reduced. The latter switching element needs to be rendered non-conductive again before the switching element in series with the diode is rendered conductive once more.

It is remarked that a switching element and the diode in parallel with it can be integrated into a single component as is the case for instance in (MOS)FETS.

It is further remarked that the high frequency at which at least one switching element is controlled in each of the operating states needs not be identical for all the operating states but can be different for different operating states.

Embodiments of the invention will be further explained making reference to a drawing.

Figure 2:
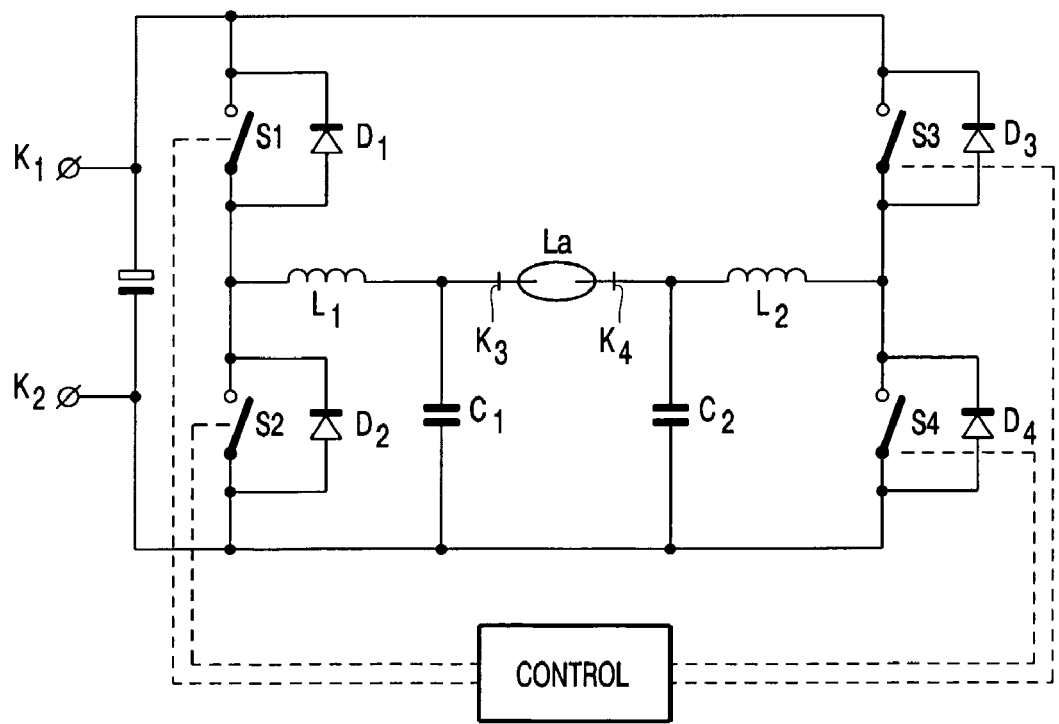
Figure 3:
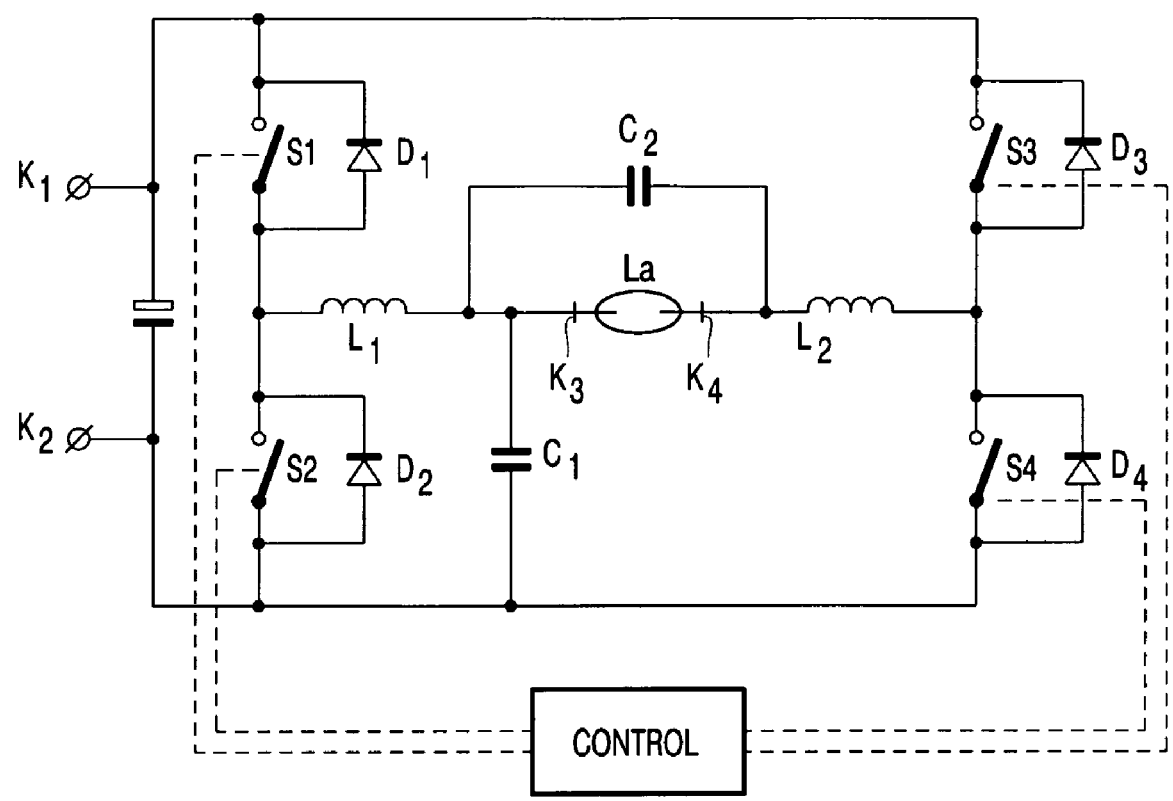

In the drawings,

FIG. 1 shows an embodiment of a circuit arrangement for operating a lamp in accordance with the prior art with a lamp connected to it, and FIG. 2 shows an embodiment of a circuit arrangement according to the invention with a lamp connected to it, and FIG. 3 shows a further embodiment of a circuit arrangement according to the invention with a lamp connected to it, and FIG. 4 shows the shape of differents currents and voltages present in the embodiment shown in FIG. 2 as a function of time.

In FIG. 1, K1 and K2 are input terminals for connection to the poles of a supply voltage source. In case of the embodiment shown in FIG. 1 the supply voltage source supplies a DC voltage. Input terminals K1 and K2 are connected by means of a first series arrangement of a first switching element S1 shunted by a first diode D1 and a second switching element S2 shunted by a second diode D2. Input terminals K1 and K2 are also connected by means of a second series arrangement of a third switching element S3 shunted by a third diode D3 and a fourth switching element S4 shunted by a fourth diode D4. A terminal between the first and the second switching element is connected with a terminal between the third and the fourth switching element by means of a series arrangement of an inductor L1, terminals for lamp connection K3 and K4 and an inductor L2. A lamp La is connected to the lamp connection terminals. The inductors L1 and L2 together with lamp connection terminals K3 and K4 and the lamp La form a load circuit. A control circuit CONTROL is coupled to control electrodes of the switching elements. This coupling is indicated in FIG. 1 by means of dotted lines. The control circuit CONTROL comprises circuitry for controlling the circuit arrangement in a first operating state, in which the fourth switching element is maintained in a conductive state while the first switching element is rendered alternately conductive and non-conductive at a high frequency, and for controlling the circuit arrangement in a second operating state in which the third switching element is maintained in a conductive state while the second switching element is rendered alternately conductive and non-conductive at a high frequency, and for alternating the operating state of the circuit arrangement between the first and the second operating state at a low frequency. A capacitor C1 shunts the series arrangement of the lamp connection terminals, the lamp La and the inductor L2. A capacitor C2 connects lamp connection terminal K4 to input terminal K2.

The operation of the embodiment shown in FIG. 1 is as follows.

When the input terminals K1 and K2 are connected to a supply voltage source the lamp is first ignited. In the ignition phase, the control circuit CONTROL renders the third switching element S3 and the fourth switching element S4 alternately conductive and non-conductive at a frequency close to the resonance frequency of inductor L2 and capacitor C2. When the lamp La ignites, the voltage across C2 generates a high peak current through the lamp, C1 and either the third or the fourth switching element. In order to prevent damage to the components due to this peak current special precautions have to be taken, such as an additional inductor in the current path (not shown in FIG. 1).

After ignition of the lamp, the control circuit CONTROL controls the circuit arrangement alternately in the first and the second operating state. In the first operating state the fourth switching element is maintained in a conductive state while the first switching element is rendered alternately conductive and non-conductive at a high frequency.

In the first operating state, the first switching element together with the second diode and the inductor L1 and capacitor C1 form a first DC-DC-converter of the type "down converter". During this first operating state, the first DC-DC-converter generates a DC current with a first polarity direction that flows through the lamp La. During the second operating state, the third switching element is maintained in a conductive state while the second switching element is rendered alternately conductive and non-conductive at a high frequency. In the second operating state, the second switching element together with the first diode and the inductor L1 and capacitor C1 form a second DC-DC-converter of the type "down converter". During this second operating state, the second DC-DC-converter generates a DC current with a second polarity direction that flows through the lamp. The control circuit alternates the operating state of the circuit arrangement at a low frequency between the first and the second operating state. Thus the lamp current is a low frequency square wave shaped AC current. As long as a properly functioning lamp is connected to the lamp connection terminals K3 and K4, the embodiment shown in FIG. 1 realizes effective lamp operation. However, in case the circuit arrangement operates without a lamp connected to it or with a lamp connected to it that does not conduct current because of failure or because the discharge temporarily extinguishes because the lamp has not yet reached stable operation, the voltage across capacitor C1 generates high peak currents through the first switching element or the second switching element when the third or the fourth switching element is rendered conductive. These high peak currents can damage the first and/or second switching element.

In FIG. 2 similar components and circuit parts are labelled with the same reference signs. A difference between the prior art embodiment shown in FIG. 1 and the embodiment shown in FIG. 2 is that capacitor C1 connects a terminal between lamp connection terminal K3 and inductor L1 to input terminal K2. Furthermore, the periodical sequence of operating states in which the control circuit controls the embodiment shown in FIG. 2 differs from that in the embodiment in FIG. 1. More in particular, the control circuit comprises circuitry for controlling the circuit arrangement in a third operating state, in which either the first switching element or the third switching element or both is/are rendered alternately conductive and non-conductive at a high frequency, for a interval between subsequent operation in the first and the second operating state, and for controlling the circuit arrangement in a fourth operating state, in which either the second switching element or the fourth switching element or both is/are rendered alternately conductive and non-conductive at a high frequency, for a time interval between subsequent operation in the first and the second operating state.

It is remarked at this stage that a circuit arrangement equivalent to the one shown in FIG. 2 can be obtained in case capacitors C1 and C2 are connected at one end to input terminal K1 instead of input terminal K2. Another but also equivalent circuit arrangement can be obtained in case capacitor C1 is replaced by a series arrangement of two capacitors connecting input terminal K1 to input terminal K2 while a common terminal of the two capacitors is connected to a terminal between inductor L1 and lamp connection terminal K3. Similarly an equivalent circuit arrangement can be obtained in case capacitor C2 is replaced by a series arrangement of two capacitors connecting input terminal K1 to input terminal K2 while a common terminal of the two capacitors is connected to a terminal between inductor L2 and lamp connection terminal K4.

The operation of the embodiment in FIG. 2 is as follows.

When the input terminals R1 and K2 are connected to a supply voltage source the lamp is first ignited. In the ignition phase, the control circuit CONTROL renders the third switching element S3 and the fourth switching element S4 alternately conductive and non-conductive at a frequency close to the resonance frequency of inductor L2 and capacitor C2. In the embodiment shown in FIG. 2, the peak current caused by the discharging of capacitor C2 mainly flows through the lamp La and capacitor C1 so that damage to the circuit arrangement is prevented.

After the lamp La has ignited, the control circuit CONTROL controls the circuit arrangement in periodical sequences of operating states. During each sequence the circuit arrangement is subsequently controlled in the first operating state, the third operating state, the second operating state and the fourth operating state. The operation of the circuit arrangement in the first and the second operating state is mainly similar to the operation in the first and second operating state in the embodiment shown in FIG. 1.

At the end of a time interval during which the circuit arrangement is controlled in the first operating state, the control circuit controls the circuit arrangement in the third operating state during which the third switching element is rendered alternately conductive and non-conductive at a high frequency, while all the other switching elements are maintained in a non-conductive state. Alternatively, the first switching element can be rendered alternately conductive and non-conductive at a high frequency, while all the other switching elements are maintained in a non-conductive state. As a further alternative both the first and the third switching element can be rendered alternately conductive and non-conductive at a high frequency, while the second switching element and the fourth switching element are maintained in a non-conductive state. The current flowing from the supply voltage source through respectively the third switching element or the first switching element or both the first and the third switching element and the capacitor C1 is charging capacitor C1. The frequency at which the switching elements is/are controlled is chosen such that the impedance of inductor L2 and/or inductor L1 is high enough to limit the amplitude of the current to a value that is low enough to prevent damage to circuit components. The time interval during which the circuit arrangement is controlled in the third operating state is chosen such that capacitor C1 has become sufficiently charged by the supply voltage source to prevent the occurrence of current peaks in the second operating state, during which the third switching element is continuously conductive. The control circuit can be further equipped with circuitry for increasing the duty cycle of the first switching element at the end of the first operating state. The increase in the duty cycle of the first switching element causes the voltage across capacitor C1 to increase at the end of the first operating state. As a consequence less current needs to flow from the supply voltage source during the third operating state to charge capacitor C1 and the time interval during which the circuit arrangement is maintained in the third operating state can be shorter. At the end of this time interval the control circuit changes the operating state of the circuit arrangement into the second operating state. Similarly, at the end of a time interval during which the circuit arrangement is controlled in the second operating state, the control circuit controls the circuit arrangement in the fourth operating state during which the fourth switching or the second switching element or both the second and the fourth switching element is/are rendered alternately conductive and non-conductive at a high frequency, while the other switching elements are maintained in a non-conductive state. The current flowing from the capacitor C1 through the second and/or the fourth switching element is discharging capacitor C1. The frequency of these high frequency pulses is chosen such that the impedance of inductor L2 and/or the impedance of inductor L1 is high enough to limit the amplitude of the current to a value that is low enough to prevent damage to circuit components. Again, the time interval during which the circuit arrangement is controlled in the fourth operating state is chosen such that capacitor C1 has become sufficiently discharged to prevent the occurrence of current peaks in the first operating state, in which the fourth switching element is continuously conductive. Preferably, the control circuit is further equipped with circuitry for increasing the duty cycle of the second switching element at the end of the second operating state. The increase in the duty cycle of the second switching element causes the voltage across capacitor C1 to decrease at the end of the second operating state. As a consequence less current needs to flow from capacitor C1 during the fourth operating state to discharge capacitor C1 and the time interval during which the circuit arrangement is maintained in the fourth operating state can be shorter. At the end of this time interval the control circuit changes the operating state of the circuit arrangement into the first operating state.

It is advantageous when the control circuit additionally comprises circuitry for controlling the circuit arrangement in a fifth operating state, in which the fourth switching element is rendered alternately conductive and non-conductive at a high frequency, during a time interval between subsequent operation in the first and the third operating state, and for controlling the circuit arrangement in a sixth operating state, in which the third switching element is rendered alternately conductive and non-conductive at a high frequency, during a time interval between subsequent operation in the second and the fourth operating state. During the fifth operating state capacitor C1 is charged so that the voltage across the capacitor C1 is increased to some extent during the fifth operating state. As a consequence the third operating state during which the capacitor C1 is charged further can be comparatively short. Similarly, capacitor C1 is discharged to a certain extent already during the sixth operating state so that the fourth operating state during which a further discharge of capacitor C1 takes place can be comparatively short. It is possible to maintain the first switching element in a conductive state during the fifth operating state and to maintain the second switching element in a conductive state during the sixth operating state. Alternatively it is possible to render the first switching element alternately conductive and non-conductive at a high frequency during the fifth operating state and to render the second switching element alternately conductive and non-conductive at a high frequency during the sixth operating state. Preferably, the control circuit is equipped with means for decreasing the duty cycle of the fourth switching element during the fifth operating state and for decreasing the duty cycle of the third switching element during the sixth operating state. This decrease in duty cycle causes the amplitude of the current charging capacitor C1 during the fifth operating state to change comparatively little during the fifth operating state so that the stress on components during the fifth operating state is more evenly spread over the duration of the fifth operating state. Also during the sixth operating state the decreasing duty cycle causes the amplitude of the current discharging capacitor C1 to change comparatively little so that stress on components is more evenly spread over the duration of the sixth operating state.

Similarly it is preferred when the duty cycle of the switching element that is operated at a high frequency during the third operating state is increased during the third operating state and when the duty cycle of the switching element that is operated at a high frequency during the fourth operating state is increased during the fourth operating state. It is thereby accomplished that the amplitude of the current charging capacitor C1 during the third operating state changes gradually. Similarly, it is accomplished that the current discharging capacitor C1 during the fourth operating state changes gradually. As a result current peaks are also suppressed in the lamp current during the third and the fourth operating state respectively.

Figure 4A:
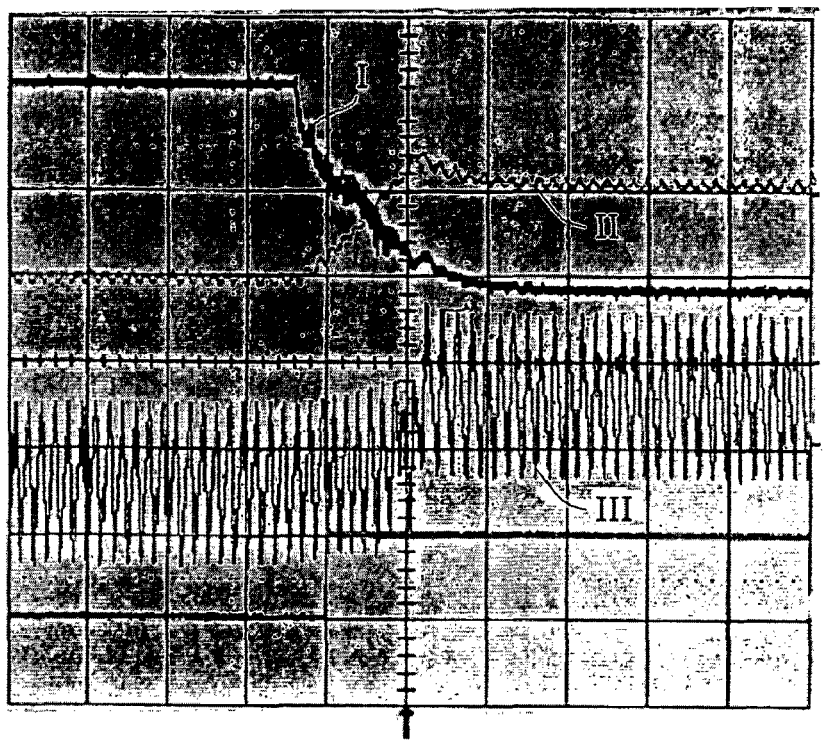
Figure 4B:
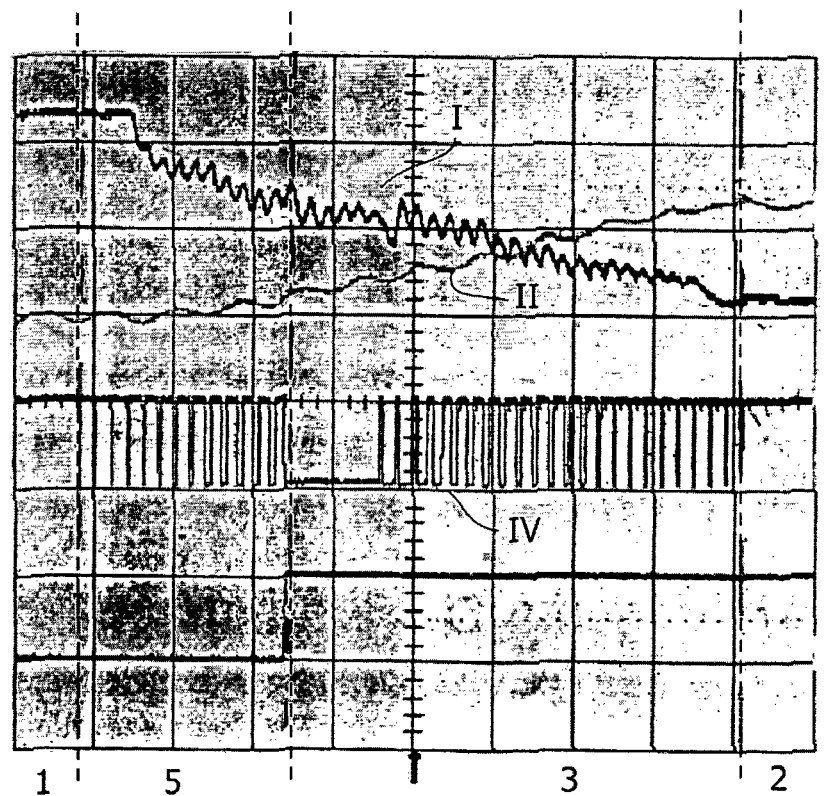

In FIGS. 4A and 4B time is plotted along the horizontal axis. In FIG. 4A curve I shows the shape of the current through the lamp as a function of time during subsequently the first, the fifth, the third and the second operating state. It can be seen that the current through the lamp is changing gradually and that the lamp current comprises no big current peaks. Curve II shows the voltage across capacitor C1 during the same time lapse. Curve III is the shape of the current at a common terminal of inductor L1 and the first and second switching element. In FIG. 4B curves I and II are shown once more but this time on a different time scale. Along the horizontal axis of FIG. 4B, the numbers 1, 5, 3 and 2 indicate the time intervals during which the circuit arrangement is in the first, fifth, third and second operating state respectively. The duty cycle of the high frequency signal operating the first switching element remains unchanged during the first operating state. During time interval 5, curve IV shows the signal generated by the control circuit that controls the conductive state of the fourth switching element. It can be seen that the duty cycle of this switching element decreases during time interval 5. During time interval 3, curve IV shows the signal generated by the control circuit that controls the conductive state of the third switching element. It can be seen that the duty cycle of this switching element increases during time interval 3.

The embodiment shown in FIG. 3 differs from the embodiment shown in FIG. 2 only in that capacitor C2 is shunting the lamp La in the embodiment shown in FIG. 3. The lamp can be effectively ignited by rendering the third and the fourth switching element alternately conductive and non-conductive at a frequency close to the resonance frequency of inductor L2 and capacitor C2 or by means of a frequency sweep. The peak current generated during ignition flows through the lamp only and thus cannot damage the components of the circuit arrangement. Otherwise the functioning of the circuit arrangement shown in FIG. 3 is very similar to that shown in FIG. 2 and will not be described in detail.

The invention claimed is:

1. Circuit arrangement for operating a lamp equipped with input terminals for connection to the poles of a supply voltage source, a first series arrangement comprising a first switching element shunted by a first diode and a second switching element shunted by a second diode and connecting the input terminals, a second series arrangement comprising a third switching element shunted by a third diode and a fourth switching element shunted by a fourth diode and connecting the input terminals, a load circuit connecting a terminal between the first and the second switching element with a terminal between the third and the fourth switching element and comprising a series arrangement of an inductor L1, terminals for lamp connection and an inductor L2, a control circuit coupled to control electrodes of the switching elements and comprising circuitry for controlling the circuit arrangement in a first operating state in which the fourth switching element is maintained in a conductive state while the first switching element is rendered alternately conductive and non-conductive at a high frequency, and for controlling the circuit arrangement in a second operating state in which the third switching element is maintained in a conductive state while the second switching element is rendered alternately conductive and non-conductive at a high frequency, and for alternating the operating state of the circuit arrangement between the first and the second operating state at a low frequency, a capacitor C1 coupled with a first end to a terminal of the load circuit between the inductor L1 and a terminal for lamp connection, characterized in that a second end of the capacitor C1 is coupled to an input terminal, and in that the control circuit comprises circuitry for controlling the circuit arrangement in a third operating state, in which the first and third switching element are operated in such a way that at least one of these switching elements is rendered alternately conductive and non-conductive at a high frequency, during a time interval between subsequent operation in the first and the second operating state, and for controlling the circuit arrangement in a fourth operating state, in which the second and fourth switching element are operated in such a way that at least one of these switching elements is rendered alternately conductive and non-conductive at a high frequency, during a time interval between subsequent operation in the second and the first operating state.

2. Circuit arrangement according to claim 1, wherein the terminals for lamp connection are connected by a circuit part comprising a capacitor C2.

3. Circuit arrangement according to claim 1, wherein the circuit arrangement comprises a capacitor C2 coupled between an input terminal and a terminal between a terminal for lamp connection and inductor L2.

4. Circuit arrangement according to claim 1, wherein the control circuit comprises circuitry for increasing the duty cycle of of the first switching element at the end of the first operating state and circuitry for increasing the duty cycle of the second switching element at the end of the second operating state.

5. Circuit arrangement according to claim 1, wherein the control circuit comprises circuitry for operating both the first and the third switching element at a high frequency during the third operating state and for operating both the second and the fourth switching element at a high frequency during the fourth operating state.

6. Circuit arrangement according to claim 1, wherein the control circuit comprises circuitry for increasing the duty cycle of each of the switching elements that is operated at a high frequency during the third operating state and for increasing the duty cycle of each of the switching elements that is operated at a high frequency during the fourth operating state.

7. Circuit arrangement according to claim 1, wherein the control circuit comprises means for rendering the first, second, third and fourth switching element conductive when respectively the first, second, third or fourth diode carries a current and for rendering the first, second, third and fourth switching element non-conductive again before rendering respectively the second, first, fourth and third switching element conductive.

8. Circuit arrangement according to claim 1, wherein the control circuit comprises circuitry for controlling the circuit arrangement in a fifth operating state, in which the fourth switching element is rendered alternately conductive and non-conductive at a high frequency, during a time interval between subsequent operation in the first and the third operating state, and for controlling the circuit arrangement in a sixth operating state, in which the third switching element is rendered alternately conductive and non-conductive at a high frequency, during a time interval between subsequent operation in the second and the fourth operating state.

9. Circuit arrangement according to claim 8, wherein the first switching element is maintained in a conductive state during the fifth operating state and the second switching element is maintained in a conductive state during the sixth operating state.

10. Circuit arrangement according to claim 8, wherein the control circuit comprises circuitry for decreasing the duty cycle of the fourth switching element during the fifth operating state and for decreasing the duty cycle of the third switching element during the sixth operating state.

11. Circuit arrangement according to claim 8, wherein the control circuit comprises circuitry for rendering the first switching element alternately conductive and non-conductive at a high frequency during the fifth operating state and for rendering the second switching element alternately conductive and non-conductive at a high frequency during the sixth operating state.

12. Circuit arrangement according to claim 11, wherein the control circuit comprises circuitry for increasing the duty cycle of the first switching element during the fifth operating state and for increasing the duty cycle of the second switching element during the sixth operating state.

* * * * *